United States Patent Office 3,481,951
Patented Dec. 2, 1969

3,481,951
N-(N'-LOWER ALKYLCARBAMOYLOXY)-IMIDES
Gerhard Boroschewski and Ernst Albrecht Pieroh, Berlin, Germany, assignors to Schering A.G., Berlin, Germany
No Drawing. Filed July 8, 1966, Ser. No. 563,723
Claims priority, application Germany, Aug. 11, 1965
Sch 37,536
Int. Cl. C07d 27/52; A01n 9/22
U.S. Cl. 260—326                           7 Claims

ABSTRACT OF THE DISCLOSURE

Compounds having the N-alkyl carbamoyl-oxymides of tetrahydrophthalic, succinic or methyl succinic, or phthalic acid, wherein the alkyl radical has 1 to 3 carbon atoms, inclusive which are useful as nematocides and fungicides.

This invention relates to nematocidal and fungicidal compositions for agriculture which contain novel imides of dicarboxylic acids.

Compounds usually employed in agriculture for simultaneously combating nematodes and pathogenic, soil-dwelling fungi, such as sodium N-methyldithiocarbamate and 3,5-dimethyl-tetrahydro-1,3,5,2-H-thidiazine-2-thione do not always satisfy practical requirements because due to their phytotoxicity a substantial waiting period must be observed between their application and the start of cultivation.

In accordance with the present invention, it has now been found that compounds of the formula

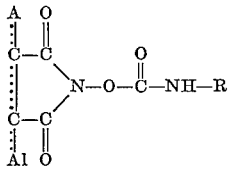

wherein A and A' jointly may constitute elements of a cycloaliphatic carbon ring which may also contain olefinic double bonds, and may individually constitute one or two hydrogen atoms, one or two methyl radicals, one methyl radical and a hydrogen atom or pointly be elements of an aromatic carbon ring; R is alkyl; and C﹕﹒﹒, C · · · A, and C﹕﹒﹒A' may constitute single or double carbon-carbon bonds; are effective against nematodes which are plant parasites and against pathogenic soil-dwelling fungi, and permit simultaneous combating of these pests without requiring a waiting period between their application and the start of crop cultivation.

Another advantage of these compounds is that they combat parasitic fungi in seeds so that compositions containing these compounds may also be employed for disinfection of seeds.

Compounds of the invention which are well suited for the afore-described applications include the N-alkyl-carbamoyoxylimides of phthalic, tetrahydrophthalic, succinic, and methylsuccinic acids, alkyl being the radical of a saturated hydrocarbon having one to three carbon atoms.

The active agents in the compositions of the invention can be prepared for example, by reacting N-hydroxydicarboxylic acid imides with the corresponding alkali metal isocyanates in an inert organic solvent such as tetrahydrofuran or ethylene chloride, preferably in the presence of catalytic amounts of triethylamine, as illustrated in the following illustrative examples:

Preparation of N-(N'-methylcarbamoyloxy)-phthalimide 978 g. (6 moles) of N-hydroxyphthalimide were suspended in about 2.5 liters tetrahydrofuran, and 1 ml. triethylamine was added. 360 g. of methylisocyanate were then added drop by drop with agitation while the temperature was held at 30° C. by cooling. Stirring was then continued for two hours at room temperature and the crystallized carbamate was filtered off with suction and washed with a little tetrahydrofuran.

Yield: 1,250 g.=95% of theory.
M.P.: 202 to 204° C. (decomp.).

According to another method, the reaction is carried out in the presence of water.

Preparation of N-(N'-methylcarbamoyloxy)-succinimide

Two moles of approximately 30% sodium hydroxide solution were added dropwise with stirring to a suspension of 200 g. (2 moles) succinic anhydride in a solution of 140 g. (2 moles) H₂NOH·HCl in 400 liters water at 20 to 25° C. A clear solution was formed. It was held for two hours at 85° C., and was then cooled to 0° C. whereupon 94.5 ml. methyl isocyanate were added slowly and 218 g. of carbamate crystallized. The filtrate was again heated to 85° C. for two hours. The subsequent reaction with 23.5 ml. of methyl isocyanate yielded additional 40 g. carbamate.

Total yield: 75% of theory.
M.P.: 149–151° C.

The following active agents of the invention may be prepared in an analogous manner:

|   | M.P., ° C. |
|---|---|
| (1) N-(N'-methylcarbamoyloxy)-succinimide | 149–151 |
| (2) N-(N'-ethylcarbamoyloxy)-succinimide | 130–131 |
| (3) N - (N' - isopropylcarbamoyloxy) - succinimide | 142–143 |
| (4) N - (N' - ethylcarbamoyl)phthalimide (decomp.) | 179–181 |
| (5) N - (N' - isopropylcarbamoyloxy)phthalimide | 170–171 |
| (6) N - (N' - methylcarbamoyloxy) - Δ₄-tetrahydrophthalimide | 159–160 |

The novel active agents are colorless, generally crystalline substances. They are very poorly or slightly soluble or insoluble in aliphatic and aromatic hydrocarbons. They are variably soluble, but usually on to a moderate degree, in ethyl acetate, chloroform, dimethylformamide, tetrahydrofuran and water, etc.

The active agents in the compositions of the invention may be employed singly or in mixtures with each other and with other nematocidal and/or fungicidal agents.

They are preferably employed in the form of compositions such as powders, spreading compositions, granulates, suspensions, or emulsions, with the addition of liquid and/or solid carriers or diluents, and with or without wetting agents, adhesion promoters, emulsifiers, and/or dispersing agents.

Because the active agents in themselves are not readily soluble, compositions prepared with the use of solid carriers are particularly suitable for the application of these agents. Suitable solid carriers are, for example, kaolin, talcum, atta-clay, and other clays.

Suitable surfactants include, inter alia, salts of ligninsulfonic acid, salts of alkylated benzenesulfonic acids, sulfonated acid amides and their salts, polyethoxylated amines and alcohols.

The various compositions may be prepared, for example, by mixing or grinding. When solid carriers are employed, it is possible to prepare compositions containing over 80% of the active agents of the invention.

The nematocidal and fungicidal compositions of the invention are preferably fed to the upper soil layers to a depth of about 8 in., for example, by rototilling for combating soil dwelling pests.

The following examples of tests further illustrate the invention herein. Compositions containing 50 or 80% active agents were employed in these following tests.

EXAMPLE 1

Effect on soil dwelling fungi

Unsteamed compost soil was additionally inoculated with mycelium of *Pythium ultimum*. After batches of the infected solid had been uniformly mixed with the active agents listed below, 25 peas of the variety "Miracle of Kelvedon" were planted in each soil mixture in respective clay dishes of one liter capacity. The number of germinated healthy pea plants after 15 days cultivation at 22–24° C. is listed below in percent.

| Active Agent | Germinated healthy peas in percent at a dosage of ... mg. active agent per liter of soil | | |
|---|---|---|---|
| | 0 mg. | 100 mg. | 300 mg. |
| (1) N-(N'-methylcarbamoyloxy)-succinimide | | 96 | 100 |
| (2) N-(N'-ethylcarbamoyloxy)-succinimide | | 84 | 96 |
| (3) N-(N'-isopropylcarbamoyloxy)-succinimide | | 60 | 92 |
| (4) N-(N'-methylcarbamoyloxy)-phthalimide | | 68 | 100 |
| (5) N-(N'-ethylcarbamoyloxy)-phthalimide | | 20 | 100 |
| (6) N-(N'-isopropylcarbamoyloxy)-phthalimide | | 48 | 96 |
| (7) N-(N'-methylcarbamoyloxy)-$\Delta_4$-tetrahydrophthalimide | | 68 | 80 |
| (8) N-trichloromethyl-thiotetrahydro-phthalimide | | 40 | 84 |
| (9) Steamed soil | 96 | | |
| (10) Untreated soil | 26 | | |

It is evident from the above test results that the tested compounds of the invention are generally superior to the known N-trichloromethyl-thiotetrahydro-phthalimide which is only known to be effective against soil-dwelling fungi. Their nematocidal effects are proved by the following test in

EXAMPLE 2

Nematocidal effect

A soil uniformly strongly infested with root gall nematodes, *Meloidogyne incognita*, was mixed with the agents listed below in the dosages indicated. Ten seed grains of cucumbers of the variety "Guntruud" were seeded immediately thereafter without a waiting period in clay dishes containing 0.5 liter of soil each. The nematocidal effect was evaluated after 26 days of cultivation at a soil temperature between 22° C. and 25° C. by counting of the root galls formed in a water bath.

| Active Agent | Nematocidal effect in percent at a dosage of ... mg. active agent per liter soil | |
|---|---|---|
| | 200 mg. | 300 mg. |
| (1) N-(N'methylcarbamoyloxy)-succinimide | 100 | 10 |
| (2) N-(N'methylcarbamoyloxy)-phthalimide | 100 | 10 |
| (3) N-(N'-methylcarbamoyloxy)-$\Delta_4$-tetrahydro-phthalimide | 100 | 10 |
| (4) N-tricholromethyl-thiotetrahydro-phthalimide | 0 | 0 |

Good nematocidal effects were also seen in analogous tests with (1) N-(N'-ethylcarbamoyloxy)-succinimide
(2) N-(N'-isopropylcarbamoyloxy)-succinimide
(3) N-(N'-ethylcarbamoyloxy)-phthalimide
4 N-(N'-isopropylcarbamoyloxy)-phthalimide

EXAMPLE 3

Tolerance by plants

The agents of the invention were uniformly mixed with unsteamed soil in the dosages indicated. The soil was seeded immediately thereafter without a waiting period with 30 grains of lettuce seed of the variety "Attraction," in clay dishes having a capacity of 0.5 liter. The weight of the freshly collected plants was determined after 12 days. The fresh weight of plants cultivated in an analogous manner in a compost soil which had been merely steamed was determined as a control. The relative fresh plant weights as compared to the controls are listed below.

| Active agent | Mg. active agent per liter of soil | Relative fresh weight of plants, percent |
|---|---|---|
| (1) N-(N'-methylcarbamoyloxy)-succinimide | 300 | 175 |
| | 400 | 152 |
| | 500 | 172 |
| | 600 | 105 |
| (2) N-(N'-methylcarbamoyloxy)-phthalimide | 300 | 132 |
| | 400 | 126 |
| | 500 | 110 |
| | 600 | 121 |
| (3) Sodium N-methyldithio-carbamate | 20 | 35 |
| | 30 | 1 0 |
| | 40 | 1 0 |
| | 50 | 1 0 |
| (4) 3,5-dimethyl-tetrahydro-1,3,5,2-H-thiadiazine-2-thione | 20 | 51 |
| | 30 | 59 |
| | 40 | 1 0 |
| | 50 | 1 0 |
| | 60 | 1 0 |

[1] No plant growth.

The following compounds did not cause significant deterioration of plant growth when employed in analogous tests in amounts of 300 mg. active agent per liter of soil:

(1) N-N'-ethylcarbamoyloxy)-succinimide
(2) N-(N'-isopropylcarbamoyloxy)-succinimide
(3) N-(N'-ethylcarbamoyloxy)phthalimide
(4) N-(N'-isopropylcarbamoyloxy)-phthalimide The advantage of the active agents of the invention as compared to sodium N-methyldithiocarbamate and 3,5- dimethyl-tetrahydro-1,3,5,2-H-thiadiazine-2-thione resides in the avoidance of the waiting period between the application of the active agents and the start of cultivation, as is evident from the examples. The preceding findings further show that the application rate of about 200 mg./liter of soil required for complete destruction of the nematodes by the active agents of the invention, see Example 2, may be exceeded by a wide margin without affecting plant growth, whereas as little as one half of the amount of the control compounds known to be necessary for the same effect, at least 60 mg./liter, completely suppresses plant growth.

The two following examples relate to the nematocidal and growth promoting effects of the agents according to the invention.

EXAMPLE 4

50 g. of a powder composition containing 50%, by weight, of N-(N'-methylcarbamoyloxy)-phthalimide were spread on each square meter of an open field strongly infested by naturally occurring root namotodes of the species Rotylenchus pratylenchus and Tylenchorhynchus, and were then roto-tilled into the ground to a depth of 5 to 6 inches. A degree of infestation of only 5% was determined four weeks after the application of the composition.

EXAMPLE 5

Various amounts of a spreading composition consisting of 50% N-(N'-methylcarbamoyloxy)-succinimide and 50% of carriers, adhesion promoting and wetting agents were uniformly worked into the soil of an open field to a depth of about 5 to 6 inches. Each treated plot was seeded immediately, without a waiting period, with one gram of lettuce seeds of the variety "Attraction." The fresh weight of the germinated lettuce plants was determined after a cultivation period of 20 days.

Dosage of active agent, g./m.$^2$:      Plant weight, g.
0 ---------------------------------------- 14
20 --------------------------------------- 65
40 --------------------------------------- 56
60 --------------------------------------- 48

The following example shows the superior effect of the compositions of the invention on parasitic fungi in seeds as compared to a known fungicide.

EXAMPLE 6

Effect on Fusarius nivale

Batches of rye seeds naturally infected with Fusarius nivale were respectively left untreated, treated with fungicides of the invention, or with N-trichloromethyl-thio-tetrahydro-phthalimide, thereafter seeded in clay containers holding nonsterile soil and cultivated in a refrigerated room at 7 to 12° C. under artificial light for two months. The infestation of the rye plants with Fusarius nivale was evaluated during the test period and was calculated in percent of infected plants from untreated rye seeds.

Relative infestation of rye in soil test, in vivo, by Fusarium nivale on the seeds, untreated controls=100

| Active agent | G. active agent per 100 kg. | Infestation |
| --- | --- | --- |
| (1) N-(N'-methylcarbamoyloxy)-succinimide | 150 | 3 |
| (2) N-(N'-methylcarbamoyloxy)-Δ₄-tetrahydro-phthalimide | 150 | 4 |
| (3) N-trichlormethyl-thiotetrahydro-phthalimide | 150 | 40 |
| Untreated | | 100 |

EXAMPLE 7

Preparation of a spreading composition

The following ingredients were intimately mixed by means of an air jet mill or other suitable mixer used in the art:

50 or 80 parts of one of the novel dicarboxylic acid imides herein.
50 or 20 parts talcum, by weight.

The spreading composition prepared by this procedure can be employed directly for combating soil dwelling pests or for distinfecting seeds in the manner described above.

It is preferred to add a small amount of hexachlorobenzene for use as a seed disinfectant in order to broaden the spectrum of pesticidal effects.

What is claimed is:
1. N-(N'-methylcarbamoyloxy)-succinimide.
2. N-(N'-ethylcarbamoyloxy)-succinimide.
3. N-(N'-isopropylcarbamoyloxy)-succinimide.
4. N-(N'-methylcarbamoyloxy)phthalimide.
5. N-(N'-ethylcarbamoyloxy)phthalimide.
6. N-(N'-isopropylcarbamoyloxy)-phthalimide.
7. N-(N' - methylcarbamoyloxy)-Δ₄-tetrahydro-phthalimide.

References Cited

UNITED STATES PATENTS 2,743,260    4/1956    Tawney ------------- 260—78

ALEX MAZEL, Primary Examiner

J. A. NARCAVAGE, Assistant Examiner

U.S. Cl. X.R.

260—326.3; 424—274